United States Patent
David et al.

(10) Patent No.: US 7,587,837 B2
(45) Date of Patent: Sep. 15, 2009

(54) PROCESS AND ACQUISITION DEVICE OF A DEFORMABLE GEOMETRICAL FORM

(75) Inventors: Dominique David, Claix (FR); Roland Blanpain, Entre-Deux-Guiers (FR)

(73) Assignee: Commissariat a l'Energie Atomique, Paris (FR)

( * ) Notice: Subject to any disclaimer, the term of this patent is extended or adjusted under 35 U.S.C. 154(b) by 92 days.

(21) Appl. No.: 11/853,567

(22) Filed: Sep. 11, 2007

(65) Prior Publication Data

US 2008/0066334 A1    Mar. 20, 2008

(30) Foreign Application Priority Data

Sep. 14, 2006   (FR)   ................... 06 53742

(51) Int. Cl.
  *G01B 7/28*   (2006.01)
  *G01B 7/16*   (2006.01)
(52) U.S. Cl. .................. 33/561.1; 33/561.2; 702/167
(58) Field of Classification Search ........... 33/561.1, 33/561.2; 702/167
  See application file for complete search history.

(56) References Cited

U.S. PATENT DOCUMENTS

| | | | | |
|---|---|---|---|---|
| 2,612,700 A | * | 10/1952 | Frisk | 33/561.1 |
| 4,534,813 A | | 8/1985 | Williamson et al. | |
| 4,640,137 A | * | 2/1987 | Trull et al. | 73/862.046 |
| 4,817,625 A | * | 4/1989 | Miles | 600/534 |
| 4,897,927 A | * | 2/1990 | Nicol | 33/534 |
| 4,910,877 A | * | 3/1990 | Sokol | 33/544 |
| 5,042,164 A | * | 8/1991 | Eppinger | 33/561.2 |
| 5,560,116 A | * | 10/1996 | Tobia | 33/365 |
| 5,640,779 A | * | 6/1997 | Rolloff et al. | 33/514.2 |
| 5,991,036 A | * | 11/1999 | Frankel | 356/364 |
| 6,127,672 A | | 10/2000 | Danisch | |
| 6,640,202 B1 | | 10/2003 | Dietz et al. | |
| 6,901,171 B1 | | 5/2005 | Dutta-Choudhury et al. | |
| 7,003,894 B2 | * | 2/2006 | Schajer et al. | 33/552 |
| 7,047,657 B2 | * | 5/2006 | Goeggelmann et al. | 33/552 |
| 7,318,286 B1 | * | 1/2008 | Willette et al. | 33/561.1 |
| 7,335,280 B2 | * | 2/2008 | Lampi et al. | 162/198 |
| 2005/0076522 A1 | | 4/2005 | Matsuki et al. | |

FOREIGN PATENT DOCUMENTS

| | | |
|---|---|---|
| EP | 0 392 881 A1 | 10/1990 |
| EP | 1 221 674 A2 | 7/2002 |
| GB | 2 326 747 A | 12/1998 |
| WO | WO 2006/095109 A1 | 9/2006 |

* cited by examiner

*Primary Examiner*—Christopher W Fulton
(74) *Attorney, Agent, or Firm*—Oblon, Spivak, McClelland, Maier & Neustadt, L.L.P.

(57) ABSTRACT

A set of sensors is placed on a form (a curve or a surface), wherein each sensor supplies representative signals of the orientation of the form at the position of this sensor; a model of the form is selected; based on the signals, the parameters of the model are determined and the distances which separate the sensors are measured; and, based on the parameters of the model and the distance measurements, the spatial distribution of the points of the form are determined.

18 Claims, 5 Drawing Sheets

PROCESS AND ACQUISITION DEVICE OF A DEFORMABLE GEOMETRICAL FORM

TECHNICAL FIELD AND PRIOR ART

This invention relates to a process and an acquisition device of a deformable geometrical form. The deformable geometrical form may be a line or a flat surface and, more generally, a warped surface.

The deformable geometrical form is defined by a deformable material, wherein the deformation of the geometrical form results from the deformations of the deformable material.

The invention relates more specifically to three dimensional acquisition or 3D acquisition of geometrically deformable forms.

It applies in particular to:
the fields of machining, joinery, masonry work, construction work and the manufacturing of everyday consumer goods,
the control of forms,
the acquisition of warped forms, such as vehicle bodywork for example, and
the study of laminar fluxes, as part of aerodynamic or hydrodynamic studies, by the temporal monitoring of appropriate sensors, floating in a gas or liquid in movement.

The invention is the improvement of a previous invention which was the subject of a French patent application entitled "Procédé et dispositif d'acquisition d'une forme géométrique" ("Process and acquisition device of a geometrical form"), filed by the Applicant under the national registration number 0550620 on Mar. 9, 2005.

In the prior art, a known 3D acquisition technique uses triangulation via laser. This technique is costly and requires reconstruction algorithms which are difficult to master. Furthermore, it has the disadvantage of generating hidden parts of the objects to which it is applied.

Another known technique of 3D acquisition uses the movement of one or several video cameras to make stereoscopic recordings of the objects studied. This other technique is generally costly and complex.

Furthermore, in both cases, equipment independent of the object studied is required.

The French patent application entitled "Procédé et dispositif d'acquisition d'une forme géométrique" relates to a simpler acquisition technique, which is less expensive and easier to use than the known techniques mentioned above. A description of it is provided below. To make the description easier to understand, in the rest of the description, the acquisition technique which is the subject of the French patent application entitled "Procédé et dispositif d'acquisition d'une forme géométrique" will be called <<basic acquisition technique>> as the technique on the basis of which the invention of this patent application is founded.

The basic acquisition technique applies to both rigid and flexible objects, for example clothing. In this last case, the basic acquisition technique also permits the variations of the form of the object to be described as a function of time.

The basic acquisition technique is applicable in real situations. It is possible, for example, to analyse in the actual situation the behaviour of the drag of a car or an aircraft wing.

In one specific aspect of the basic acquisition technique, angular sensors are used, distributed across a curve or a surface suited to match the form to be determined. Using a signal processing procedure, the coordinates of each of the points where the sensors are located are determined. It is thus possible to deduce the spatial distribution of the points which compose the form studied.

It should moreover be noted that theoretically classic techniques may be used to make sensors which allow the basic acquisition technique to be used. However, only microtechnologies or nanotechnologies are capable of allowing this technique to be developed.

In fact, microtechnologies or nanotechnologies permit sensors to be used whose weight is negligible compared to the weight of the devices whose curves and/or surfaces are to be determined. Consequently any material may be transformed to use the basic acquisition technique without the initial mechanical characteristics of the material being substantially affected.

Furthermore, the microtechnologies or nanotechnologies allow a significant number of points of measurement to be used in the material, which is to say hundreds or even thousands of points, or more, which permits the field of applications of the basic acquisition technique to be widened.

More precisely, the purpose of the basic technique is an acquisition process of a geometrical form, which is to say a curve or a surface, by determination of the coordinates of the points of this curve or this surface, wherein this process is characterised in that:
a set of sensors is placed on this form, wherein each sensor is provided to supply representative signals of the orientation of the curve or the surface at the position of this sensor,
a model of the curve or the surface is chosen,
based on the signals, the parameters of the model are determined, and
based on these parameters, the spatial distribution of the points of the geometrical form are determined.

In one first embodiment of the basic acquisition technique, the sensors are fixed to a support made of a solid and deformable material, capable of matching the form to be acquired. This support may form a line or a surface.

In one variant of the first embodiment of the basic technique, the support is flexible. In this case, if the form to be acquired has one or more maximum spatial frequencies and if the number of sensors is at least equal, per unit of length or surface, to twice the value of the maximum frequency, then it is possible to sample locally the curve or the surface by means of the sensors.

In a second embodiment of the basic acquisition technique, the sensors are mechanically independent from one another and the form to be acquired is reconstructed progressively, based on the signals supplied by the sensors. This is the case, for example, when the different sensors are not on a same support.

In the basic acquisition technique, the form of a curve or a surface which defines a solid object may be acquired. Advantageously, in the case of a support being used that is made of a solid and deformable material, then it is also possible to acquire the intrinsic form of the deformable support.

In the basic technique, each sensor may be further provided to determine the distance which separates it from the neighbouring sensors, and the form to be acquired is reconstructed progressively.

An acquisition device of a geometrical form of the basic acquisition technique comprises:
a set of sensors, wherein each sensor is provided to supply representative signals of the orientation of the curve or of the surface to the position of this sensor, and
electronic processing means for the signals supplied by the sensors, wherein these means are provided to determine, based on a model of the curve or of the surface, the parameters of the model and to determine, based on these coordinates, the spatial distribution of the points of the geometrical form.

In a first embodiment of the device of the basic acquisition technique, the sensors are fixed to a support made from a solid and deformable material, capable of matching the form to be acquired.

In a second embodiment of the device of the basic acquisition technique, the sensors are mechanically independent from one another.

The sensors may be selected from accelerometers, magnetometers and force or pressure sensors.

Figure 1A:
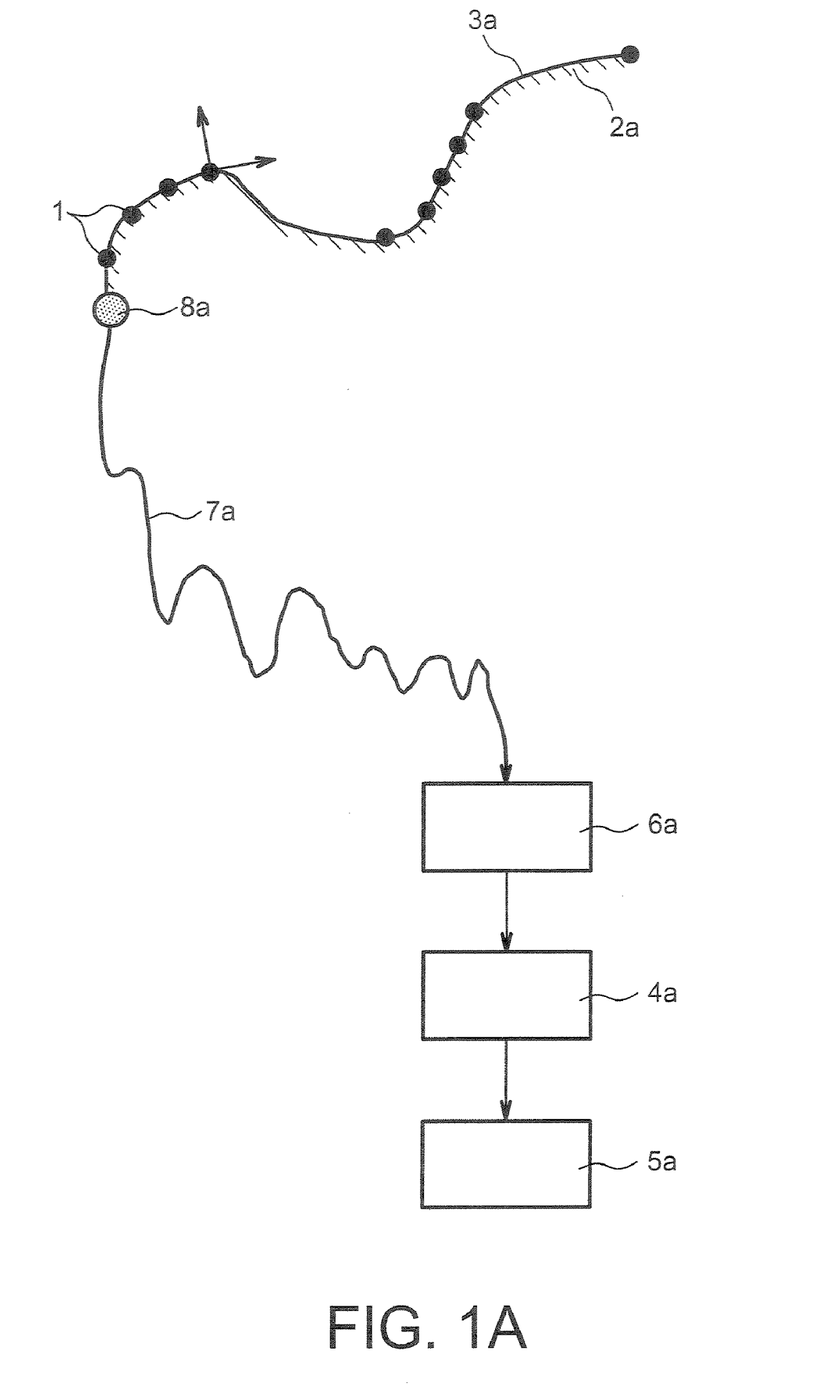
Figure 1B:
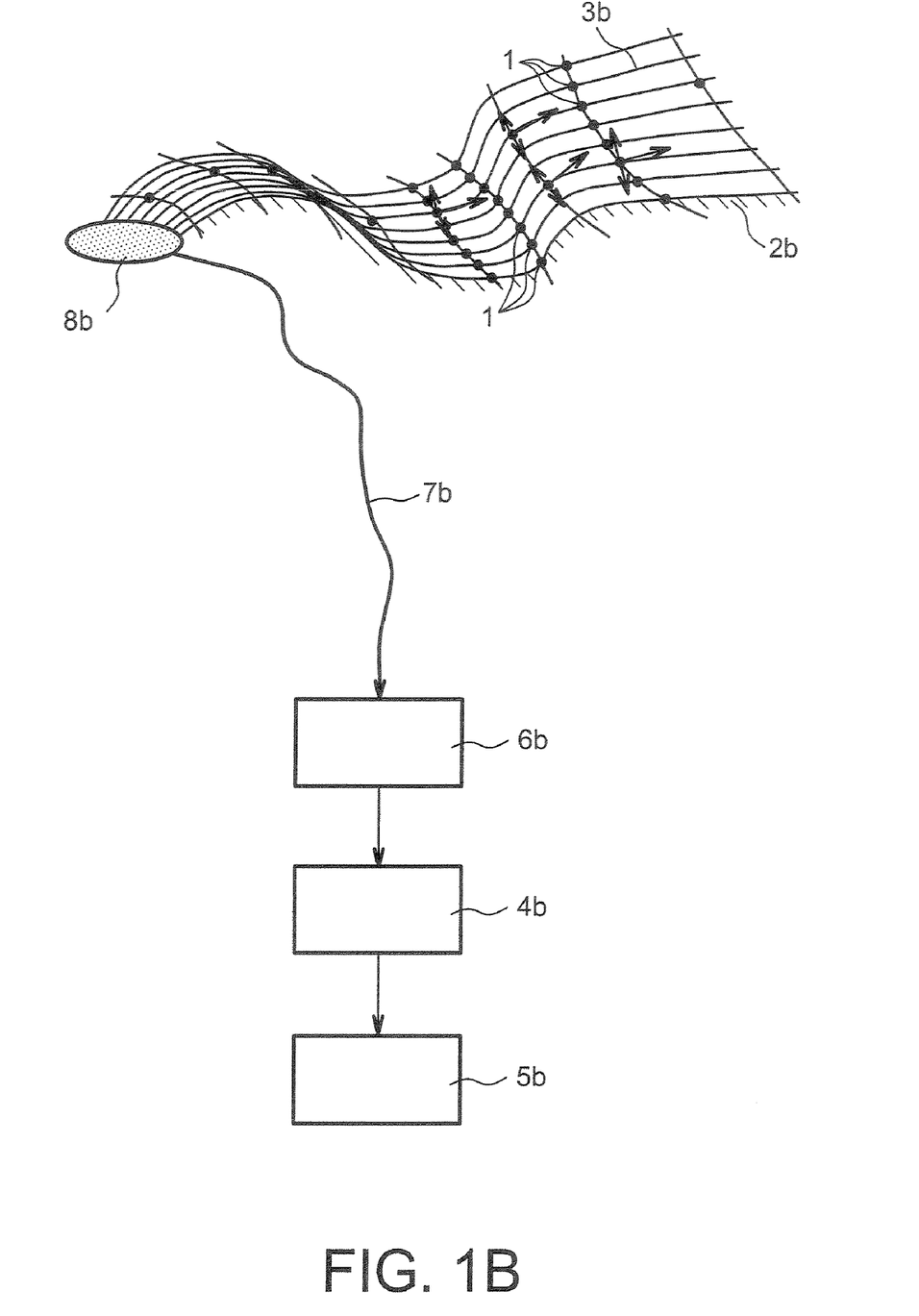
Figure 2:
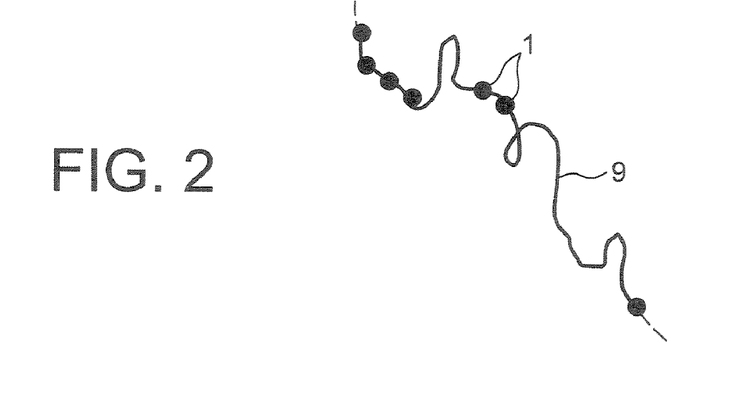
Figure 3:
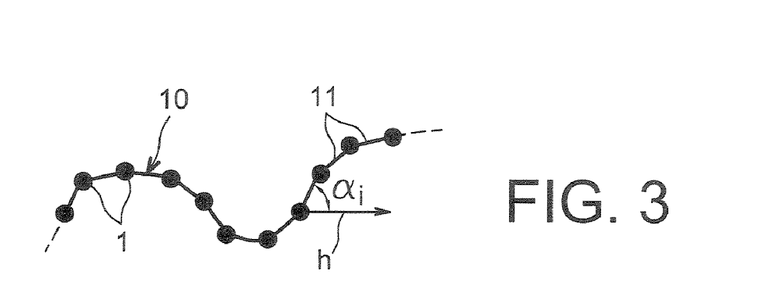
Figure 4:
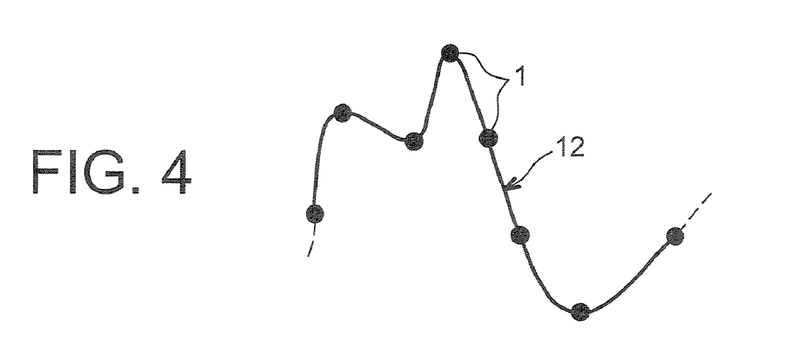

The basic acquisition technique will be better understood after reading the description of embodiments provided below, in reference to the appended FIGS. 1A, 1B, 2, 3 and 4, among which:

FIG. 1A is a diagrammatical view of an example of an acquisition device of a curve of the basic acquisition technique, FIG. 1B is a diagrammatical view of an example of a surface acquisition device of the basic acquisition technique, FIG. 2 is a diagrammatical view of an acquisition device of a curve in the form of a non rigid wire support equipped with sensors of the basic acquisition technique, FIG. 3 is a diagrammatical view of an acquisition device of a curve in which each portion of curve between two sensors is assimilated to one right segment, and FIG. 4 is a diagrammatical view of a rigid support that may be used in the basic acquisition technique.

FIGS. 1A and 1B are diagrammatical views of specific embodiments of the acquisition device of geometrical form of the basic acquisition technique.

The devices of FIGS. 1A and 1B comprise a set of sensors 1 which are placed, respectively, on the curve defining the object 2a (cf. FIG. 1A) and on the surface defining the object 2b (cf. FIG. 1B). Each sensor 1 is provided to supply electrical signals representative of the orientation of this curve or this surface, to the position of the sensor in question.

The sensors 1 are, for example, accelerometers or magnetometers which are fixed to a support 3a (cf. FIG. 1A) or 3b (cf. FIG. 1B), wherein said support is made of a solid material capable of matching the form that is to be acquired.

In the example of FIG. 1A, the support 3a is a line whereas, in the example of FIG. 1B, the support 3b is a surface.

The device of FIG. 1A or 1B further comprises electronic processing means 4a or 4b, provided to process the signals supplied by the sensors 1, to determine the coordinates of each of the points where these sensors are located and also to determine, based on these coordinates, the spatial distribution of the points of the curve 2a or of the surface 2b.

In FIG. 1A or 1B, display means 5a or 5b may be seen, which permit the display of the results of the calculations made by the electronic processing means 4a or 4b.

Acquisition means 6a or 6b may also be seen, which permit the acquisition of the measurements made by the sensors 1. The measurements acquired by the means 6a or 6b are transmitted to the electronic processing means 4a or 4b.

The sensors are connected to the acquisition means 6a or 6b by means of wire or wireless connections 7a or 7b.

In FIGS. 1A and 1B, the respective references 8a and 8b show electronics (optionally) onboard the support which are used to collect the information from the sensors and to transmit it (possibly via a wireless connection) to the respective measurement acquisition means 6a and 6b. The support is made of a material that is sufficiently flexible that it may match the form measured. As seen, the support may extend along a line or a surface. In both cases, the support may be totally free. This may be, for example, a simple string. On the contrary, this support may have specific flexibility properties (for example a maximum authorised curve or controlled elasticity) or intermediate properties between the case of a support that is totally free and the case of a support with a specific flexibility. By way of example, there are the flexible rulers which are used by architects as supports with such intermediate properties.

The sensors which are located on the support are capable of reproducing geometrical information.

By way of example, simple accelerometers may be used which are capable of reproducing, each one, a slope with respect to the vertical direction. It is also possible to use bi-axial or tri-axial accelerometers which each reproduce, respectively, two or three slopes with respect to the vertical direction. It is also possible to use magnetometers which each reproduce, a slope with respect to the direction of the earth's magnetic field.

In the basic acquisition technique, it is also possible to use sensors such that between them they are not only capable of reproducing geometrical information but also of determining the distance which separates it from the sensors closest to it. By way of example, such sensors may be composed by radio frequency micro systems which establish the distance which separates them by a classic triangulation process or by measuring flight time. It is also possible to use strain sensors which are sensitive to the elongation of the material (stress gauge, displacement of micro-magnet in front of magnetic micro sensors, etc.).

Finally, force sensors may also be used, possible three dimensional, or stress micro gauges located inside the material. The flexion of the material creates local efforts which are measured by these sensors.

As previously mentioned, the sensors are connected electrically to electronic acquisition means. It may be useful to connect a serial bus between all or some of the sensors, so as to limit the number of wires required to collect the information. Furthermore, the processing means, which are connected to these acquisition means, are typically a computer such as a personal computer (PC).

A device of the basic technique may be used to acquire:

(a) the form of a given curve or surface, for example the size of a warped cut out or the surface of a piece of furniture, or (b) the intrinsic form of the material which composes the support, for example in the case of where the manner in which a fabric hangs is to be determined.

The processes of the basic technique which are described below are valid in the first case (a). In return, they are only valid in the second case (b) if the weight of the sensors and the possible rigidity of the sensor network (where said rigidity is due to the inter-connection between the sensors) do not modify the intrinsic behaviour of the material of the support. This is made possible by the use of microtechnologies and nanotechnologies.

It may also be envisaged to use another device of the basic acquisition technique in which the sensors have non negligible weights with respect to the weight of their support. However, in this last case, the reconstruction process of the form of the support is much more complex.

Advantageously, in general, the miniaturisation used in the basic acquisition technique extends beyond a simple factor of scale and provides new feasibility.

As seen above, for the application of a process of the basic technique, the support is brought into contact with an object that is to be measured. Several cases are presented.

1st Case: Non Rigid Support (for Example String Type).

This case is diagrammatically illustrated by FIG. 2 where such a support 9 may be seen, of string type, and thus forming a line or, more precisely, a warped curve. Sensors 1 are fixed to this support, along its length.

A non rigid support is suited to the acquisition of the form of a material such as a fabric for example. It is thus possible to measure, for example, the deformations of a fabric or the manner in which this fabric hangs. The sensors are fixed to the fabric such that the respective distances between the sensors are known, in the given rest state, which is to say when the fabric is fully stretched and thus has flat parts. Two sub-cases then arise.

1a) the number of sensors is high enough so that the data provided by the sensors provide local sampling of the surface that is to be analysed. For example, a set of accelerometers and magnetometers then permit the local tangents to be acquired at the surface of the fabric studied.

By application of Shannon's theory, it is possible to deduce the number of sensors, required to analyse a given curve or surface, and to analyse the spatial frequencies present in the curve or the surface. The number of sensors will be at least equal to twice the value of the maximum frequency.

If there are a lot more sensors than the curves to be analysed, then this is a situation of over-sampling. In this case, the process which permits the curve or the surface acquired is as follows.

Each portion surrounding a sensor is assimilated to a right segment (in the case of a support in line form) or to a portion of a plane (in the case of a support forming a surface). The reconstruction is made by the successive juxtaposition of all of the elementary portions or all of the segments, wherein each segment or portion is orientated according to the value supplied by the sensor borne by this segment or this portion.

To this end, refer to FIG. 3 which concerns the reconstruction using rectilinear elements. A support can be seen which forms a line 10. The sensors 1 fixed to this support 10 can also be seen. Between the sensors, the support is assimilated to right segments 11. The angle $\alpha_i$ is also shown, formed by the $i^{th}$ of these segments 11 with a horizontal direction h, wherein this segment is at a tangent to the form studied, at the point where one of the two sensors defining this segment is located.

1b) the sensors are in <<limited>> number, almost twice the value of the maximum frequency.

In this case, the process of the basic technique consists of attributing a specific model which is no longer locally linear as in the case of 1a) but more complex.

For example the curve is modelled by analytic formulation, for example by a two or three dimensional Béziers curve or even by a two or three dimensional B-spline. As concerns the surface, it may be modelled by a polynomial of the type f(x,y,z)=0 or by a Béziers surface.

In the case where the sensors supply representative signals of angles measured locally on the curve or the surface studied, the measurements thus obtained are associated to the analytic formulation of these same local angles, where said formulation deduced from the model chosen.

The resolution of the system of equations thus obtained provides an estimation of the parameters of the model. In this case, it should be noted that the surfaces and curves that are measured must satisfy the criteria of the curves, or spatial frequencies, which are compatible with the number of sensors of the device of the basic technique that is used. To this end, refer to paragraph 1a above.

Purely by way of information and in no way restrictively, an example of a calculation process of an acquired surface is provided below, in the case of a direct calculation.

Where z=f(x,y) is the equation of the surface sought. The measurements of the sensors at the point Mi are noted Pi1, Pi2 . . . . ACi designates the known curvilinear abscissa of the point Mi.

The sensors supply for example the values of the slopes of the local tangent plane in Mi with respect to the vertical direction and the earth's magnetic field, wherein these sensors are accelerometers and magnetometers in the example in question. These values are converted into local tangents at the surface sought.

This surface sought is determined by resolving the system of the three following equations:

$Pi1 = df(xi,yi)/dxi$ $Pi2 = df(xi,yi)/dyi$

Curvilinear abscissa at the point $(xi,yi) = ACi$.

In this system of equations, Pi1 and Pi2 correspond to the tangents and ACi corresponds to the relative position of the sensors prior to the deformation of the surface studied.

Purely by way of information and in no way restrictively, another example of a process of the basic technique is provided below, for the calculation of an acquired surface, in the case of an inverse calculation.

This calculation requires several steps, which is to say:

STEP 1: a hypothesis is made on a parameter q, which is translated by the following equation:

$Z = f(x,y,q0)$ where $q0$ is the vector of initial parameters which defines the initial representation of the curve.

STEP 2: using this equation, the estimated measurements Ri of the values of the local tangents are determined, for example:

$Ri1 = df(xi,yi,q0)/dx$ (calculation of the tangents locally).

STEP 3: the estimated measurements Ei of the outputs from the angular sensors supposed to be situated at the points (xi, yi) are also determined.

STEP 4: using the results obtained in steps 2 and 3, the distance between the actual outputs of the sensors Pi and their estimated values Ei are calculated.

STEP 5: if the distance calculated is below a predefined threshold, for example equal to 1% of the value measured by the sensors, the result is displayed.

STEP 6: if this distance is greater than or equal to this predefined threshold, then classic methods (for example the gradient descent method) are used to update the vector q0 by replacing it with a new vector q1, which is the vector of the parameters of the curve or the surface at the first iteration, and the second step is repeated with this new vector.

2nd Case: the Support is Rigid

This case is illustrated, by way of non restrictive example, by FIG. 4 which shows a support that matches the form of a line 12 and which has sensors 1, wherein the length of the intervals between the sensors is related to the maximum measurable curve and depends on the rigidity properties of the pre-stressed material from which the support is made. Such a support has intrinsic curve properties. It may be, for example, a roll of photographic negatives.

In this case, the process is analogous to the process that has been explained in paragraph 1b above.

However, in this second case, it is possible to choose, in preference, a mathematical model which takes account of the intrinsic properties of the material used for the support.

The basic acquisition technique thus has two advantages. On the one hand, the number of sensors required may be limited, possibly up to an optimal limit suited to the geometrical model of the material. On the other hand, the handling of the device of the basic acquisition technique is made easier by the rigidity properties of the support.

$3^{rd}$ Case: Each Point of Measurement has Means for Measuring the Distance to its Closest Neighbours.

In this third case, the process of reconstruction is in fact simpler because, from one of the points of measurement, it is possible to reconstruct progressively the entire form sought, based on the angular information and the distance information.

It must be possible, in the first approximation, to have the complete translation vector between two points of measurement and thus to have three orders of grandeur between these two points. In general, it is the orientation of the vector (from 1 to 3 degrees of freedom) that is measured and the norm of this vector.

$4^{th}$ Case: the Physical Support of the Sensors is Removed.

The sensors are here mechanically independent from one another. In this case, the points of measurement are placed at various points of a surface that is to be acquired. Such a surface may be, for example, the surface of the roof of a house or a monument.

The surface is progressively reconstructed using the measurements, as described in paragraph 3 above.

Furthermore, information that is a priori on the acquired surface (for example the fact that the surface is only composed of flat segments or that the maximum curve of this surface is equal to a known value) permits the number of points of measurement to be limited and to reconstruct all of the date, wherein the recourse to information known a priori is translated by interpolation techniques (using for example a polynomial of a given degree or a curve that can be broken down into linear portions).

Below are various advantages of the basic acquisition technique:
  leads to a data acquisition system in three dimensions, that is manageable and easy to use;
  it permits cheap, classic sensors to be used, which allow a device of the invention to be made at low cost;
  it is compatible with measurements on light materials such as fabrics and paper and may thus be applied to such materials;
  the device of the basic acquisition technique may be either integrated into a material used for the first time, or added to a material that is already in use;
  the device of the basic acquisition technique has a scalability which permits it to adapt to applications of various sizes;
  it is possible to follow the variations of the form of a curve or a surface in function of time.

Purely by way of information and in no way restrictively, below is another example of the invention.

On the periphery of a wheel (not shown) located in a vertical plane, a device of the basic acquisition technique (line form support) is positioned, whose length is at least equal to the perimeter of this wheel.

The sensors used are accelerometers and are positioned regularly on the device, at a distance d from one another. The angle measured by each point of measurement corresponds to a slope with respect to a vertical direction, said slope which varies from one point to the next of $\Delta\alpha=d/R$, wherein R is the radius of the wheel.

However such a device also measures a local deformation, for example a flat portion of a flat tyre, wherein this portion is in contact with the ground.

Purely by way of information and in no way restrictively, below is yet another example of basic acquisition technique.

A support is used composed of a flexible printed circuit such as a <<flex>>. This flexible printed circuit has for example a length of 2 metres and a width of 1 or 2 cm.

At regular intervals, for example every centimeter or every 2 cm or every 5 cm, a set of four sensors is placed flat on the circuit (which is for example in the form of a ribbon), for example two accelerometers and two magnetometers which are sensitive to the earth's magnetic field. A single type of sensor may be used or the types may be alternated (with limits on the performances of the device obtained), or other types of sensors may be used.

The sensors are digital output models or, on the contrary, analogue output models.

The information is collected along the length of the flexible circuit by a I2C type bus. It is collected via an I2C interface and sent to a RS serial connection or a parallel connection or a USB interface or transmitted via a wireless connection of the Bluetooth or WiFi types. Finally it arrives at a PC where it is processed using one of the processes described above.

The result is used in 3D display software or to command a digital machine.

In spite of the significant advantages presented by the basic technique with respect to the prior art, this technique does not allow, on its own, to resolve simply the problem of the acquisition of the form when the latter is subject to deformations which cause a variation in the distance between the sensors. This case occurs, for example, when determining the forms of the human body (the skin, as an elastic support of the sensors, follows the deformations of the human body).

The U.S. Pat. No. 6,640,202 discloses another known prior art. The data acquisition which permits the form of an elastic surface to be determined is carried out using sensors positioned on an elastic structure in a fillet form. The embodiment proposed uses radio-frequency positioning for the sensors. It is therefore necessary to have a high power source to power as many emitter-receivers as there are points of measurement. For each measurement node, it is necessary to attach digital intelligence on board the object whose form is to be determined. Furthermore, this data acquisition system requires the presence of a reference. Such a system is therefore difficult to use.

The invention does not have the disadvantages of the prior art.

DESCRIPTION OF THE INVENTION

The present invention uses all of the essential characteristics of the basic acquisition technique previously mentioned. The additional characteristics specific to the invention concern the means used to measure the deformations of the material which define the form to be acquired.

Consequently, the invention relates to an acquisition process of a geometrical form defined by a deformable material, wherein the geometrical form is deformed by the deformations of the deformable material, wherein the process comprises the steps consisting of:
  placing, in different parts of the geometrical form, a set of sensors, wherein a sensor is provided to supply representative signals of the orientation of the geometrical form to its position,
  selecting a model of the form, based on the signals supplied by the sensors, determining the parameters of the model, measuring the distances which separate the sensors from one another, based on the parameters of the model and the distance measurements which separate the sensors from one another, determining a spatial distribution of the points of the geometrical form, wherein the process is characterised in that it further comprises the following steps:

the sensors are fixed to a support made of a solid elastic material which matches all or part of the geometrical form to be acquired and which is capable of following the deformations of the material which defines the geometrical form, wherein the support is equipped with at least one element in the form of a zigzag woven in the solid elastic material which matches the geometrical form to be acquired, wherein the sensors are placed on the successive segments of the zigzag element.

In one additional characteristic of the invention, the sensors placed on the successive segments of the element in the form of a zigzag compose at least one alignment of sensors.

In another additional characteristic of the invention, the support is equipped with at least two zigzag elements woven in the solid elastic material, wherein at least one first element in the form of a zigzag is orientated in one first direction and at least one second element in the form of a zigzag is orientated in one second direction different from the first direction.

In still another additional characteristic of the invention, the first direction is substantially perpendicular to the second direction.

In still another additional characteristic of the invention, the support is composed of at least two elastic ribbons, wherein each elastic ribbon is equipped with at least one element in the form of a zigzag woven in the solid material which composes it, wherein the ribbons are distributed in two different directions, wherein the sensors are placed on successive segments of the zigzag elements.

In still another additional characteristic of the invention, the two different directions are substantially perpendicular.

In still another additional characteristic of the invention, the form to be acquired has one or more maximum spatial frequencies and the number of the sensors is at least equal per unit of length or surface, to twice the value of the maximum frequency, and the form is sampled locally by means of the sensors.

In still another additional characteristic of the invention, the geometrical form is a form which sets the limits of a deformable object.

In still another additional characteristic of the invention, the geometrical form is a form defined inside a deformable object.

In still another additional characteristic of the invention, the geometrical form is a curve or a surface.

The invention also relates to an acquisition device of a geometrical form defined by a deformable material, wherein the geometrical form is deformed by the deformations of the deformable material, characterised in that it comprises:

one set of sensors, wherein one sensor is provided to supply representative signals of the orientation of the geometrical form to its position, and electronic processing means for the signals supplied by the sensors, wherein these means are provided:

to determine the parameters of the model based on one model of the geometrical form, to measure the distances which separate the sensors from one another, and to determine, based on the parameters of the model determined and the measurements of the distances between sensors, a spatial distribution of the points of the geometrical form, characterised in that the sensors are fixed to a support made of a solid elastic material which matches all or part of the geometrical form to be acquired and which is capable of following the deformations of the material which defines the geometrical form, wherein the support is equipped with at least one element in the form of a zigzag woven in the solid elastic material which matches the geometrical form to be acquired, wherein the sensors are placed on successive segments of the zigzag element.

As part of the invention, the sensors are selected, for example, among accelerometers, magnetometers, force sensors and pressure sensors.

BRIEF DESCRIPTION OF THE FIGURES

Other characteristics and advantages of the invention will become clear upon reading the preferred embodiments made in reference to the attached figures among which:

FIGS. 1a, 1b, 2, 3 and 4 concern invention and have been described previously;

DETAILED DESCRIPTION OF EMBODIMENTS OF THE INVENTION

Figure 5:
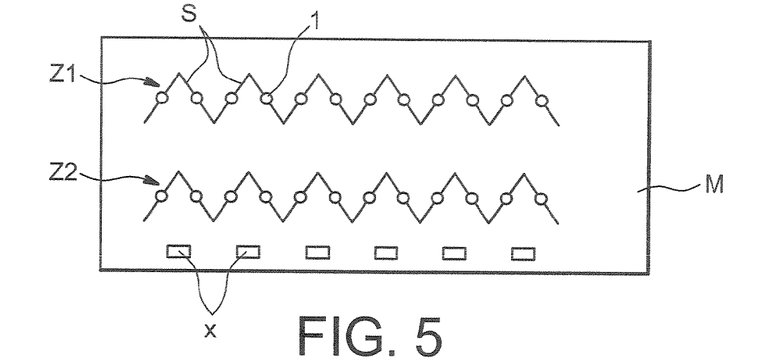
FIG. 5 shows a first example of the structure of the invention capable of acquiring measurements permitting the deformations of a geometrical form to be followed in the case where the material which defines the geometrical form is at rest (no deformation))

FIG. 5 shows a first example of the structure of the invention capable of acquiring measurements permitting the deformations of a geometrical form to be followed in the case where the material which defines the geometrical form is at rest (no deformation)).

The structure of the invention comprises a support M made of a solid elastic material which matches the geometrical form to be acquired (in this case, a rectangle R), zigzag elements Z1, Z2 preferably woven in the support M and sensors 1 fixed to the zigzag elements. One element in the form of a zigzag in the form of a succession of segments s onto which the sensors 1 are fixed (stitched, glued, etc.). The segments s may be, for example, small rigid elements. Woven in the solid elastic material of the support M, the zigzag elements are capable of following the deformations of the solid elastic material of the support M (cf. the deformations of the zigzag of FIGS. 6 and 7). In one specific embodiment, sensors x, whose use will be clarified later, are aligned and fixed to one side of the elastic support M. The deformable material which composes the elastic support M may be, for example, rubber or a flexible fabric containing rubber strands. Preferably, a single sensor 1 is fixed to a segment s of a zigzag element. In the embodiment of FIG. 5, the sensors placed on the successive segments of a same element in the form of a zigzag form an alignment. In other embodiments of the invention, the sensors have an arbitrary position on the different segments s and do not form an alignment, wherein the sole condition to be established is to identify their position on the different segments. The sensors 1 are stitched or glued to the segments 1. Other embodiments are also possible for the sensor offset, especially the latest known techniques for the insertion of small miniature objects in fabrics.

Figure 6:
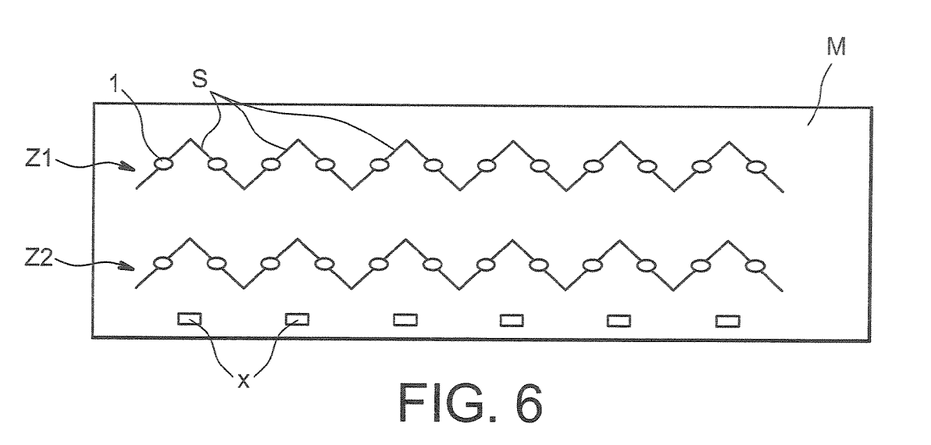
FIG. 6 shows the first example of the structure of the invention capable of acquiring measurements permitting the deformations of a geometrical form to be followed in the case where the material which defines the geometrical form is stretched in a first direction (horizontally)
Figure 7:
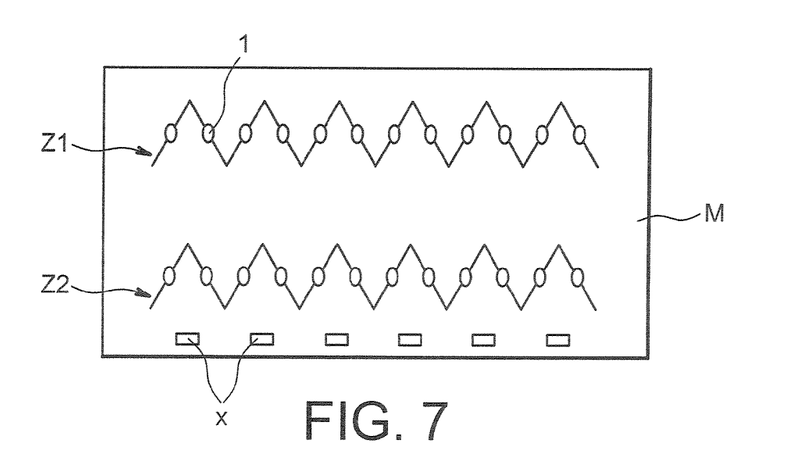
FIG. 7 shows the first example of structure of the invention capable of acquiring measurements permitting the deformations of a geometrical form to be followed in the case where the material which defines the geometrical form is stretched in a second direction (vertically)

FIGS. 6 and 7 show, respectively, the first example of the structure of the invention capable of acquiring measurements permitting the deformations of a geometrical form to be followed in the case where the material which defines the form is stretched in a first direction (horizontal elongation in FIG. 6) and in the case where the material which defines the form is stretched in a second direction (vertical elongation in FIG. 7). In the case of FIG. 6, the elongation of the form R, and therefore of the support M, is horizontal and in the case of FIG. 7, the elongation of the form R, and therefore of the support M, is vertical. In both cases, the zigzag element is deformed due to its capacity to follow the deformations of the elastic material M. In the first case (FIG. 6) the zigzag form stretches and in the second case (FIG. 7), the zigzag form tightens.

The angle measured by each sensor 1, for example with respect to the longest side of the rectangle R, thus varies with the deformation of the material and with the orientation of the edge. Reading this angle, made for the various sensors, thus permits the stretching (FIG. 6) or the tightening (FIG. 7) of the zigzag form to be identified and, therefore, the distance between the sensors to be determined. The determination of the distance which separates the sensors, associated to the steps described above of the basic technique concerning the acquisition of a geometrical form, thus advantageously permit the form sought to be acquired regardless of its deformations. The sensors x previously mentioned advantageously permit the simplification of the calculations of distances between sensors. As shown in FIGS. 5-7, the sensors x follow the deformation of the form in a single direction selected beforehand, for example the direction parallel to the longest side of the rectangle R. Preferably, each sensor x is furthermore placed in the vertical axis of the mid point which separates two neighbouring sensors of a same zigzag element.

Figure 8:
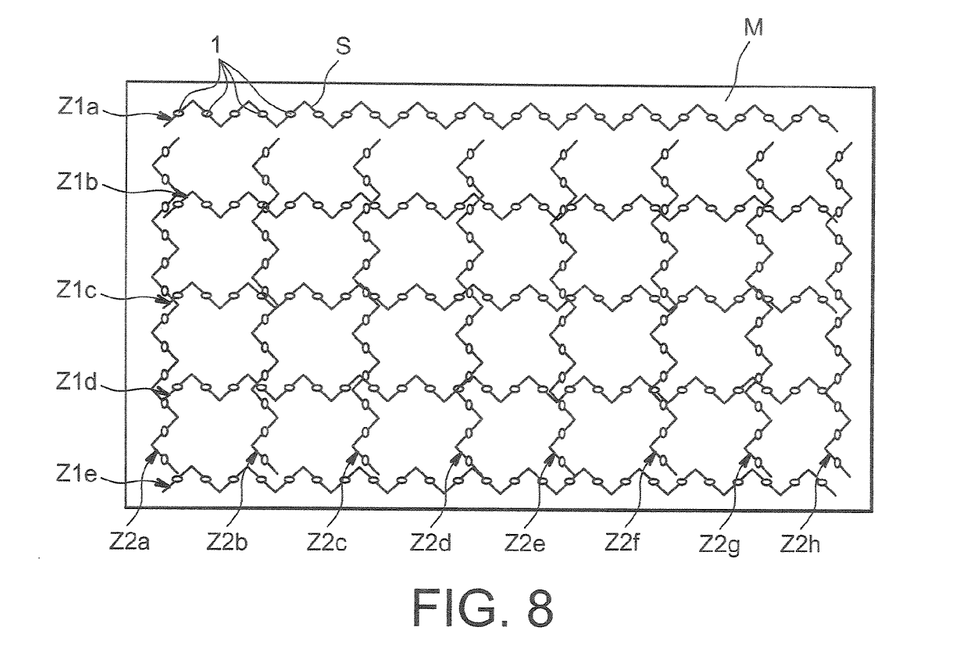
FIG. 8 shows a second example of structure of the invention capable of acquiring measurements permitting the deformations of a geometrical form.
Figure 9:
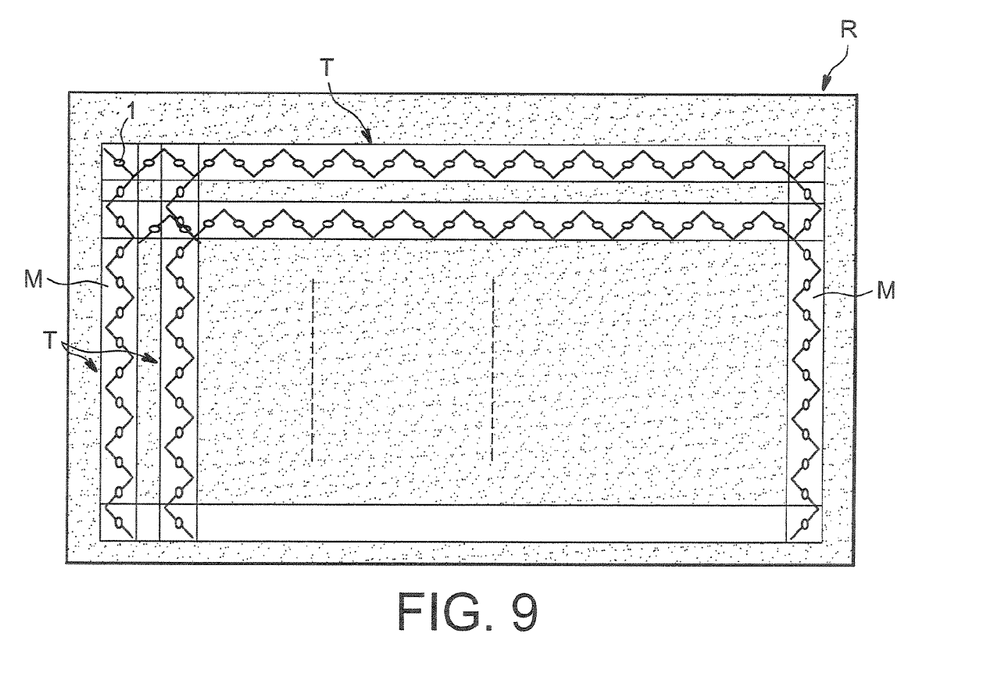
FIG. 9 shows a third example of structure of the invention capable of acquiring measurements permitting the deformations of a geometrical form.

With such a structure as that shown in FIGS. 5-7, in the case of stretching that is substantially equal in the horizontal and vertical axes, the directions measured by each sensor are conserved. This shows a disadvantage. In order to overcome this disadvantage, other structures are envisaged. FIGS. 8 and 9 correspond to these other structures.

FIG. 8 thus shows a second example of the structure of the invention capable of acquiring measurements permitting the deformations of a geometrical form to be followed. Zigzag elements Z1a, Z1b, Z1c, Z1d, Z1e are woven, in a first direction, in the solid elastic material M whereas zigzag elements Z2a, Z2b, Z2c, Z2d, Z2f, Z2g, Z2h are woven, in a second direction in the solid elastic material M, wherein each segment s of a zigzag element is equipped with a sensor 1.

FIG. 9 shows a third example of the structure of the invention capable of acquiring measurements permitting the deformations of a geometrical form to be followed. The elastic support of the sensors is here composed of ribbons T made from an elastic material. Each ribbon T is equipped with at least one zigzag element equipped with sensors 1. The elastic ribbons T are distributed, on the surface of the deformable material or in the deformable material (rectangle B) in two main axes which may or may not be perpendicular (the axes are perpendicular in the example of FIG. 9). These ribbons undergo anisotropic stretching due to their form factor and the measurements of the sensors may thus be used, even in the case of identical elongation in both axes.

The invention claimed is:

1. An acquisition process of a geometrical form defined by a deformable material, wherein the geometrical form is deformed by the deformations of the deformable material, wherein the process comprises:

placing, in different positions of the geometrical form, a set of sensors, wherein a sensor is provided to supply representative signals of the orientation of the geometrical form to its position, selecting a model of the form, based on the signals supplied by the sensors, determining the parameters of the model, measuring the distances which separate the sensors from one another, and based on the parameters of the model and the measurements of the distance which separate the sensors from one another, determining a spatial distribution of the points of the geometrical form, wherein, the sensors are fixed to a support made from a solid elastic material which matches all or part of the geometrical form to be acquired and that is capable of following the deformations of the material which defines the geometrical form, the support is equipped with at least one element in the form of a zigzag woven in the solid elastic material which matches the geometrical form to be acquired, and the sensors are placed on successive segments of the zigzag element.

2. The process of claim 1, in which the sensors placed on the successive segments of the zigzag element compose at least one alignment of sensors.

3. The process of claim 1 or 2, in which the support is equipped with at least two zigzag elements woven in the solid elastic material, wherein at least one first zigzag element is orientated in a first direction and at least one second zigzag element is orientated in a second direction different from the first direction.

4. The process of claim 3, in which the first direction is substantially perpendicular to the second direction.

5. The process of claim 1, in which the support is composed of at least two elastic ribbons, wherein each elastic ribbon is equipped with at least one element in the form of a zigzag woven in the solid material which composes it, wherein the ribbons are distributed in two different directions, and wherein the sensors are placed on successive segments of the zigzag elements.

6. The process of claim 5, wherein the two different directions are substantially perpendicular.

7. The process of claim 1, wherein the form to be acquired has one or more maximum spatial frequencies and the number of sensors is at least equal, per unit of length or surface, to twice the value of the maximum spatial frequency, and wherein the form is sampled locally by the sensors.

8. The process of claim 1, wherein the geometrical form is a form which sets the limits of a deformable object.

9. The process of claim 1, wherein the geometrical form is a form defined inside a deformable object.

10. The process of claim 1, wherein the geometrical form is a curve or a surface.

11. The process of claim 1, wherein the determining the spatial distribution of the points of the geometrical form includes using a processing apparatus.

12. An acquisition device of a geometrical form defined by a deformable material, the geometrical form being deformed by the deformations of the deformable material, the acquisition device comprising:

a set of sensors, wherein a sensor is provided to supply representative signals of the orientation of the geometrical form at its position, and electronic means for processing the signals supplied by the sensors, wherein these means are provided:

to determine the parameters of the model based on one model of the geometrical form, to measure the distances which separate the sensors from one another, and to determine, based on the parameters of the model determined and the measurements of the distances between sensors, a spatial distribution of the points of the geometrical form, wherein the sensors are fixed to a support made of a solid elastic material which matches all or part of the geometrical form to be acquired and which is capable of following the deformations of the material which defines the geometrical form, the support is equipped with at least one element in the form of a zigzag woven in the solid elastic material which matches the geometrical form to be acquired, and the sensors are placed on successive segments of the zigzag element.

13. The device of claim 12, wherein the sensors placed on the successive segments of zigzag element form at least one alignment of sensors.

14. The device of any of claim 12 or 13, wherein the support is equipped with at least two zigzag elements woven in the solid elastic material, and at least one first element in the form of a zigzag is orientated in a first direction and at least one second element in the form of a zigzag is orientated in a second direction different from the first direction.

15. The device of claim 14, wherein the first direction is substantially perpendicular to the second direction.

16. The device of claim 12, wherein the support is composed of at least two elastic ribbons, wherein each elastic ribbon is equipped with at least one element in the form of a zigzag woven in the solid material which composes it, wherein the elastic ribbons are distributed in two different directions, and wherein the sensors are placed on successive segments of zigzag element.

17. The device of claim 16, wherein the two different directions are substantially perpendicular.

18. The device of claim 12, wherein the sensors are selected from accelerometers, magnetometers, force sensors and pressure sensors.

* * * * *